United States Patent [19]

Kurokawa et al.

[11] Patent Number: 5,602,727
[45] Date of Patent: Feb. 11, 1997

[54] IMAGE PROCESSOR

[75] Inventors: Noboru Kurokawa; Tatsunobu Ando, both of Tokyo, Japan

[73] Assignee: Sony Corporation, Tokyo, Japan

[21] Appl. No.: 180,715

[22] Filed: Jan. 13, 1994

[30] Foreign Application Priority Data

Jan. 27, 1993 [JP] Japan .................................. 5-011807

[51] Int. Cl.$^6$ .............................. G05B 14/18; H04N 1/40
[52] U.S. Cl. .......................... 364/131; 382/304; 382/307
[58] Field of Search ..................................... 364/131–136; 382/276, 279, 302, 303, 304, 307

[56] References Cited

U.S. PATENT DOCUMENTS

| | | | |
|---|---|---|---|
| 4,606,066 | 8/1986 | Hata et al. ................................. | 364/134 |
| 4,790,026 | 12/1988 | Gennery et al. ............................ | 382/49 |
| 4,850,027 | 7/1989 | Kimmel ..................................... | 364/133 |
| 4,949,390 | 8/1990 | Iverson et al. ............................. | 364/133 |
| 5,103,311 | 4/1992 | Sluijter et al. ............................ | 558/160 |
| 5,274,717 | 12/1993 | Miura et al. ............................... | 364/133 |

FOREIGN PATENT DOCUMENTS

| | | | |
|---|---|---|---|
| 0080836A3 | 6/1983 | European Pat. Off. ...... | G06F 15/336 |
| 0316956A2 | 5/1989 | European Pat. Off. ........ | G06F 15/66 |
| 62-20-8158 | 9/1987 | Japan .............................. | G06F 15/16 |
| 63-118885 | 5/1988 | Japan .............................. | G06F 15/66 |

OTHER PUBLICATIONS

Proceedings of the IEEE 1989 Custom Integrated Circuits Conference, 15 May 1989, San Diego, CA USA, pp. 24.4.1–24.4.4; Aono K. Et al: "A 30 ns (600 Mops) Image Processor With a Reconfigurable Pipeline Architecture."

*Primary Examiner*—Paul P. Gordon
*Assistant Examiner*—Thomas E. Brown
*Attorney, Agent, or Firm*—Limbach & Limbach; Philip M. Shaw, Jr.

[57] ABSTRACT

An image processor comprising a plurality of processor elements each having a product sum calculating function. Input switching means are incorporated for selection of image data so that the desired data in an arbitrary processing step of any one processor element can be transferred to an arbitrary processing step of the other processor element. Each processor element includes a data writing line memory, a multiplier for multiplying the output data of the line memory, a register file for storing the multiplied output therein, and an accumulator for calculating the output of the register file. Pipeline processing of the data can be executed in such constitution, and due to the provision of the input switching means in the preceding stage of each processing circuit, the image data can be transferred between the processor elements to consequently realize enhanced general ability for the image processing.

6 Claims, 22 Drawing Sheets

FIG. 5

|   | → PIXEL | | | | |
|---|---|---|---|---|---|
| a | D00 | D01 | D02 | D03 | D04 |
| b | D10 | D11 | D12 | D13 | D14 |
| c | D20 | D21 | D22 | D23 | D24 |
| d | D30 | D31 | D32 | D33 | D34 |
| e | D40 | D41 | D42 | D43 | D44 |

↓ LINE

FIG. 6

| M00 | M01 | M02 | M03 | M04 |
|---|---|---|---|---|
| M10 | M11 | M12 | M13 | M14 |
| M20 | M21 | M22 | M23 | M24 |
| M30 | M31 | M32 | M33 | M34 |
| M40 | M41 | M42 | M43 | M44 |

FIG. 10

| STEP | TIME POINT | t0 t1 t2 t3 t4 | t5 t6 t7 t8 t9 | t10 t11 t12 t13 t14 | t15 t16 t17 |
|---|---|---|---|---|---|
| a | MPY1 PROCESS | D00×M00→R0<br>D01×M01→R1<br>D02×M02→R2<br>D03×M03→R3<br>D04×M04→R4 | D01×M00→R5<br>D02×M01→R6<br>D03×M02→R7<br>D04×M03→R8<br>D05×M04→R9 | D02×M00→R0<br>D03×M01→R1<br>D04×M02→R2<br>D05×M03→R3<br>D06×M04→R4 | |
| b | ALU1 PROCESS<br>LOAD VIA TERMINAL C OF RF1 | | R0+R1→R1<br>R2+R3→R3<br>R1+R3→R3<br>R3+R4→R10a | R5+R6→R6<br>R7+R8→R8<br>R6+R8→R8<br>R8+R9→R11a | R0+R1→R1<br>R2+R3→R3<br>R1+R3→R3<br>R3+R4→R12a |
| c | LOAD IN RF1 OF PU4 | | | R10a OUTPUT | R11a OUTPUT |

FIG. 12

| TIME POINT | PU1 | | PU2 | | | | PU4 | | |
|---|---|---|---|---|---|---|---|---|---|
| | RF1 | RF2 | RF1 | RF2 | RF3 | RF1 | ALU | LM1 | |
| t9 | R10d | R10e | | | | | | | |
| t10 | | R10d | R10a | R10b | R10c | | | | |
| t11 | | | R10e | R10b | R10c | R10a | | | |
| t12 | | | R10e | R10d | R10c | R10b | | | |
| t13 | | | R10e | R10d | | R10c | | | |
| t14 | | | | R10d | | R10e | | | |
| t15 | | | | | | R10d | | | |
| t16 | | | | | | | R10a + R10b = R001 | | |
| t17 | | | | | | | R10c + R10e = R002 | | |
| t18 | | | | | | | R001 + R002 = R003 | | |
| t19 | | | | | | | R10d + R003 = R00 | | R00 |

| -1  | -3  | 0 | 3  | 1  |
|-----|-----|---|----|----|
| -7  | -15 | 0 | 15 | 7  |
| -11 | -24 | 0 | 24 | 11 |
| -7  | -15 | 0 | 15 | 7  |
| -1  | -3  | 0 | 3  | 1  |

F I G. 16A

IMAGE DATA

| D00 | D01 | D02 | D03 | D04 | D05 |
|---|---|---|---|---|---|

IMAGE ADDRESS   A00  A01  A02  A03  A04  A05

F I G. 16B

MASK DATA

| M00 | M01 | M03 | M04 |
|---|---|---|---|
| -1 | -3 | 3 | 1 |

MASK ADDRESS   0    1    2    3

F I G. 17

| ADDRESS VALUE | ADDRESS | M P Y 1 |
|---|---|---|
| 0 | A00 | D00 × M00 |
| +1 | A01 | D01 × M01 |
| +2 | A03 | D03 × M03 |
| +1 | A04 | D04 × M04 |
| -3 | A01 | D01 × M00 |
| +1 | A02 | D02 × M01 |
| +2 | A04 | D04 × M03 |
| +1 | A05 | D05 × M04 |

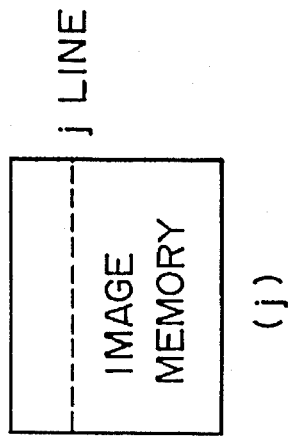
FIG. 20A
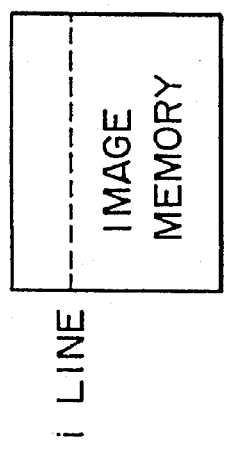
FIG. 20B
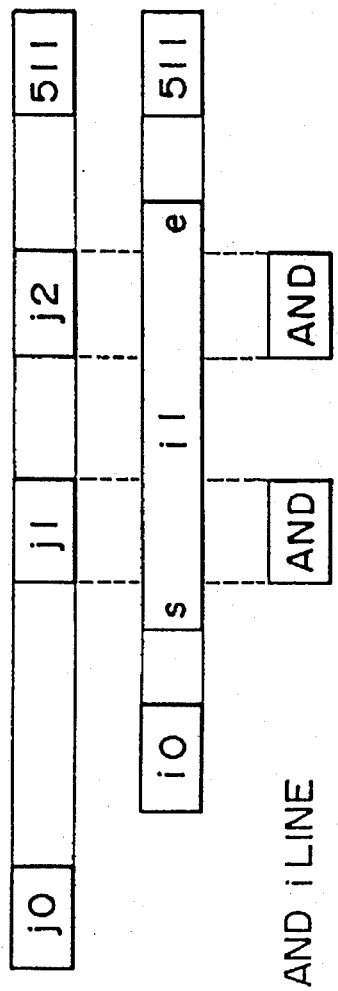
FIG. 21A  j LINE
FIG. 21B  i LINE
FIG. 21C  AND OF j LINE AND i LINE

FIG. 25

| PROCESSOR | PE1 | | PE2 |
|---|---|---|---|
| STATUS | (a) | (c) | (b) |
| STATUS REGISTER | SR0' | SR1' | SR0' |
| ADDRESS TO SEQUENCER SEQ3 | A0 | A1 | A2 |
| BRANCH CONDITION K1 | O(a>0) | I(c<0) | I(b<0) |
| BRANCH CONDITION K2 | I(a≦0) | I(c≦0) | I(b<0) |
| BRANCH CONDITION K3 | I(a<0) | O(c>0) | I(b≦0) |
| BRANCH CONDITION K4 | I(a<0) | O(c>0) | O(b>0) |

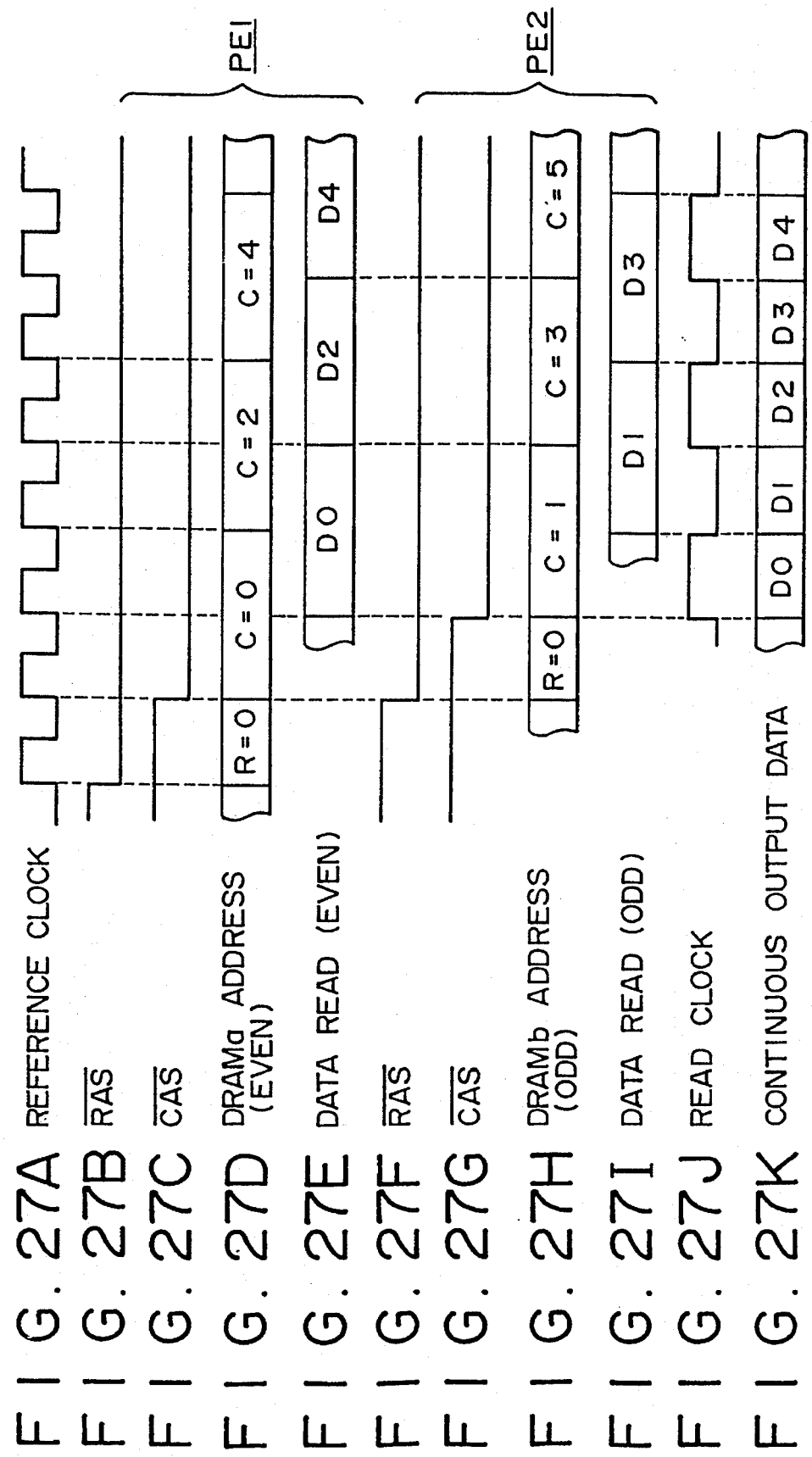

IMAGE PROCESSOR

BACKGROUND OF THE INVENTION

1. Field of the Invention

The present invention relates to a general-purpose image processor adapted for use in an image data filtering process or the like.

2. Description of the Related Art

It is customary that an image processor is designed for exclusive use so as to be suited for a special processing purpose. Regarding the parallel processor for dealing with two-dimensional image, there are known some conventional examples as disclosed in Japanese Patent Laid-open No. Sho 62 (1987)-208158.

The technology described in the above is concerned with a contrivance where image processing algorithms are formed into individual circuits according to the respective functions and are integrated to constitute a single LSI, so that any specific algorithm for calculation of a product sum or the like can be executed fast by inputting parameters.

As for the processor operated under microprogram control, there are also known some conventional examples as disclosed in Japanese Patent Laid-open No. Sho 63 (1988)-118885. The technology described in the above is so contrived that four local processor units are incorporated in a single LSI in such a manner that each processor unit serves as a multiprocessor on the basis of a microprogram.

Since any of such conventional image processors is designed for a predetermined purpose alone, a fast operation can be performed in executing a specific algorithm, but execution of any other algorithm is impossible. And even by combining a plurality of processors mutually, the multiprocessor constitution is adapted merely for a specific algorithm alone due to the disadvantage that data communication is not realizable between the processors.

Because of such lack of the general usability, it is impossible to attain extension of the processor from a product sum calculation of, e.g., (3×3) size to that of a (5×5) or greater size, or to achieve a higher operation speed by employing a plurality of processors for split processing.

If data communication is rendered possible between processors, it follows that mutual processes of the data in, e.g., two image memories can be executed to consequently simplify the operation of calculating the logical sum or OR of the two image data. Furthermore it becomes possible, by utilizing the address function of a register file, to realize application to an address control circuit and so forth for an image memory.

SUMMARY OF THE INVENTION

The present invention has been accomplished in an attempt to solve the above problems observed in the prior art. And its object resides in providing an improved image processor which realizes enhanced usability for general purpose.

According to a first aspect of the present invention, there is provided an image processor comprising a plurality of processor elements each having a product sum calculating function, wherein each of the processor elements is capable of transferring desired data to any processing step thereof from any processing step of the other processor element.

According to a second aspect of the invention, there is provided a general-purpose image processor including three image processor units to execute a product sum calculation of data of (5 pixels×5 lines), wherein two of such image processor units are used for intra-line data processing, while the remaining image processor unit is used for inter-line data processing.

According to a third aspect of the invention, at least two or more processor elements are used for inputting data from two or more image memories so as to process the mutual data, and the data loaded in a register file of each processor element can be fed into an accumulator in the other processor element by controlling an input switching means disposed in the preceding stage of each accumulator.

According to a fourth aspect of the invention, in the use of a general-purpose image processor unit as an image-memory control circuit, two processor elements included therein serve as address generators for image memories, and the image data read from the image memories are once stored in the line memories of the processor unit. And such action of storing the data is controlled by the remaining processor element in the image processor unit.

In the first aspect of the invention, each of processor elements PE1, PE2, PE3 comprises, as shown in FIGS. 1 and 2, a line memory LM for writing data, a multiplier MPY for multiplying the output data of the line memory LM, a register file RF for holding the multiplied output and so forth, and an accumulator ALU for calculating the output of the register file RF.

An input switching means MUX for selection of data is disposed in the preceding stage of each processing circuit, so that the data in any desired processing steps of the processor elements can be transferred mutually by controlling the input switching means MUX. For example, the data can be fed into any of the line memories LM1–LM4 by controlling the input switching means MUX1, and the data of any of the line memories LM1–LM4 can be fed into any of the multipliers MPY1–MPY3 by controlling the input switching means MUX2 and MUX10.

Consequently, as disclosed in the other aspects of the invention, it becomes possible to transfer the data between the processor elements and also to perform data communication between processor units PU each consisting of a plurality of processor elements.

The general-purpose image processor according to the first through fourth aspects of the invention includes at least one processor unit which consists of a plurality of processor elements each having a product sum calculating function, and is based on the improved constitution where each of the processor elements can transfer the data to any desired processing step thereof from any processing step of the other processor element.

By adopting the technique mentioned, it is rendered possible to enhance the usability of the general-purpose processor. Due to the execution of pipeline processing, the processor is usable for product sum calculation, and extension of the product sum calculating operation can be realized with facility by employing a plurality of such processor units. Furthermore, data transfer is achievable between the processor elements in any one processor unit, so that image processing and so forth with two or more image memories are rendered easily realizable.

In the present invention, therefore, a superior processor conforming with individual purposes is accomplishable by properly selecting the number of processor elements and contriving the combination thereof for any image processing other than that in the preferred embodiments.

The above and other features and advantages of the present invention will become apparent from the following description which will be given with reference to the illustrative accompanying drawings.

BRIEF DESCRIPTION OF THE DRAWINGS

FIG. 5 shows an exemplary arrangement of image data;

FIG. 6 shows an exemplary arrangement of filter coefficients;

FIG. 10 is a diagram for explaining a product sum calculation executed in one processor unit;

FIG. 12 is a diagram showing how an operation for addition is performed;

FIG. 16 is an explanatory diagram relative to the process in FIG. 15;

FIG. 17 shows an operation for multiplication and the relationship among addresses in such operation;

FIG. 20 is an explanatory diagram of image memories;

FIG. 21 is an explanatory diagram of an AND operation;

FIG. 25 is a diagram for explaining the operation in FIG. 24;

FIG. 27 is a waveform chart of signals for explaining the operation in FIG. 26.

DETAILED DESCRIPTION OF PREFERRED EMBODIMENTS

Hereinafter a preferred embodiment representing the general-purpose image processor of the present invention will be described in detail with reference to the accompanying drawings which are concerned with application to the above-described image processing.

Figure 1:
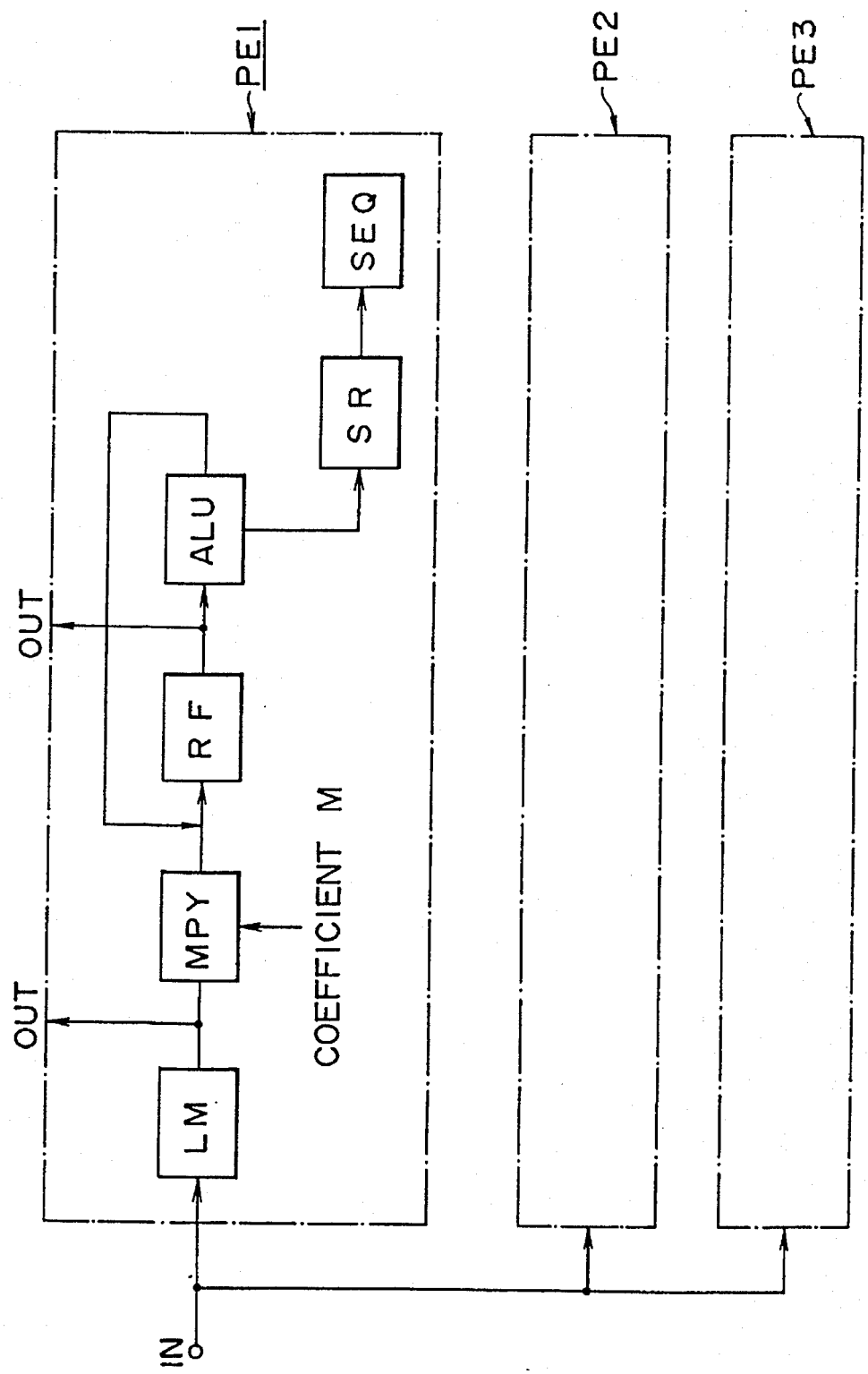
FIG. 1 is a schematic block diagram showing the fundamental constitution of an image processor of the present invention.

FIG. 1 shows a fundamental constitution of the present invention, wherein the general-purpose image processor unit PU comprises a plurality of processor elements PE, i.e., three elements PE1–PE3 in this embodiments, each having a calculating function.

The processor elements PE are so contrived as to be capable of inputting the mutual image data into any desired processing steps to each other. However, the connections thereof are omitted in FIG. 1 for simplifying the explanation, and therefore the individual processor elements are shown to be mutually independent. Since the processor elements PE1 through PE3 are structurally the same, the constitution of the processor element PE1 will be taken as an example in the following description.

Denoted by LM is a line memory in the processor element PE1 shown in FIG. 1. Since this embodiment is based on the premise of processing image data, one memory is used for a unitary line. The image data read from the line memory LM is multiplied by a predetermined coefficient M in a multiplier MPY. The result of such multiplication is stored at a predetermined address in a register file RF.

The plurality of image data read from the register file RF are integrated in an accumulator ALU, and the result is stored again in the register file RF. The result of the integration thus stored in the register file RF is read out therefrom and then is loaded in a register file of the other processor element PE2 or PE3.

The status data (such as carry, overflow, sign or zero) obtained as a result of the integration in the accumulator ALU is once stored in a status register SR, and the status data (1 bit) is used as a portion of the address in a microprogram stored in a sequencer SEQ.

The sequencers SEQ1–SEQ3 are provided for controlling the processor elements PE1–PE3 respectively, and an operation mode is determined by the microprogram incorporated therein.

There exist some cases where, in addition to the input image data, the result of calculation outputted from the other processor unit PU is also stored in the line memory LM, and such result is finally stored in the other image memory. Therefore the output of the line memory LM is delivered as final data to an external circuit while being used as input data to the aforementioned multiplier MPY.

Figure 2:
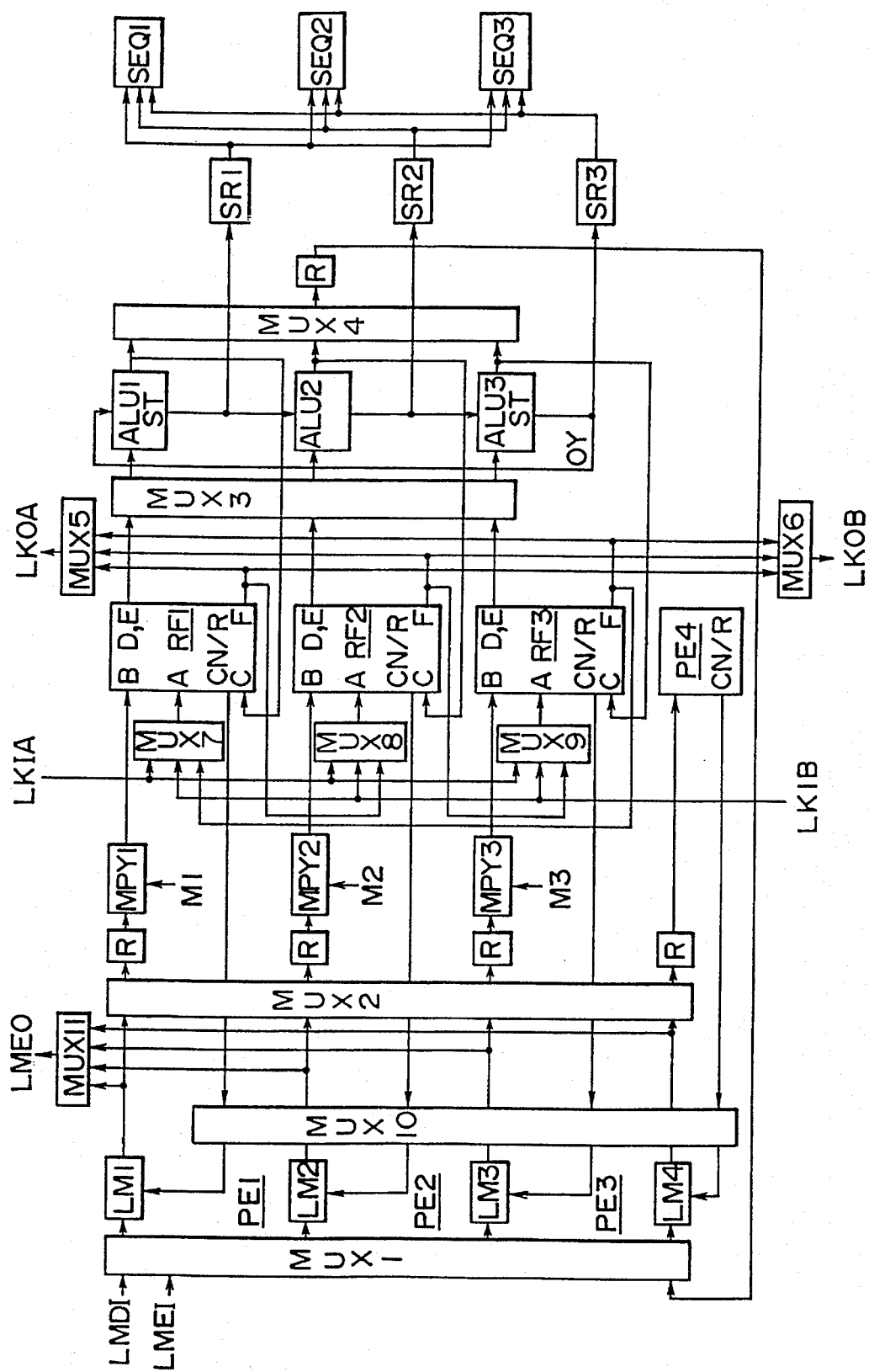
FIG. 2 is a system diagram showing a preferred embodiment of the image processor.

Each of the processor elements PE1–PE3 is so contrived as to be capable of receiving input image data or processed data from any of the other processor elements PE1–PE3 at any step during the operation. FIG. 2 shows an exemplary constitution designed to achieve such purpose.

In FIG. 2, four line memories LM and three multipliers MPY are employed. Due to the use of three multipliers MPY, there are used three register files RF, three accumulators ALU, three status registers SR and three sequencers SEQ which are disposed in the respective following stages.

In the example where such illustrative numbers of the component circuits are employed, three input data are supplied to an input switching means MUX1 which selects desired one of the input data and delivers the selected data as an output. The first input data LMDI is the image data obtained from an image memory (not shown) provided outside, and the second input data LMEI is the image data obtained from the other processor unit PU. And the third input data is the image data which is the result of the calculation in the relevant processor unit PU.

The respective outputs of the line memories LM are selectively switched by the input switching means MUX2 and are determined to be supplied to which of the multipliers MPY1–MPY3. The line-memory designating address signals are outputted from address counters CN incorporated in the register files RF1–RF3. In response to the address signals from such address counters CN, the outputs of the line memories LM1–LM4 can be designated and supplied to the corresponding multipliers MPY1–MPY3 respectively. Denoted by R is a buffer register.

Each of the register files RF1–RF3 has a total of 7 terminals inclusive of three input terminals A, B, C, three output terminals D, E, F and one address terminal CN, wherein input and output processes and address designation can be executed simultaneously.

The result of multiplication is loaded from the terminal B, while the image data selected by the input switching means MUX7, MUX8 or MUX9 is loaded from the terminal A. The input switching means MUX3 selectively switches the time data (terminals D, E) of the register files RF1–RF3 to be supplied to the accumulators ALU1–ALU3.

The input switching means MUX4 is used for selecting one of the results of calculations to be written in one of the line memories LM via the buffer register R. In this case, the input switching means MUX3 and MUX1 operate simultaneously. The outputs of the accumulators ALU1–ALU3 are loaded via the terminals C of the register files RF1–RF3, respectively.

The input switching means MUX5 and MUX6 are used for selecting the output image data (terminals F) of the register files RF1–RF3 and delivering the selected data to the other processor units. The output data LKOA and LKOB selected by the input switching means MUX5 and MUX6 respectively become input image data LKIA and LKIB (image data being processed) in the other processor units.

The input switching means MUX10 is controlled by the processor element PE4 and is used for control of an external output at the time of writing the image data of the line memory LM in the other image memory or the like. The input switching means MUX10 is driven in response to the address counter output CN produced by the microprogram in the processor element PE4 and serves to select one specific line memory LM. An unshown processor element PE4 controls the other input switching means MUX1–MUX11 as well.

The image data read out from the line memories LM are supplied to the input switching means MUX11, which then selects merely one image data to thereby deliver output image data LMEO therefrom.

In this manner, the input switching means MUX10 is controlled, during the data processing operation, by the address counter output CN obtained from the register files RF1–RF3. However, when the final output image data is delivered to an external circuit, the input switching means MUX10 is controlled by the address counter output CN obtained from the processor element PE4.

The processor element PE4 comprises the register file RF, the accumulator ALU, the status register SR and the sequencer SEQ out of the component circuits of the aforementioned processor elements PE1–PE3.

The register files RF1–RF3 are capable of transferring the output image data merely to the vertically adjacent register files, and such transfer of the output data is performed by selecting the aforementioned input switching means MUX7, MUX8, MUX9. Therefore the input switching means MUX7, MUX8, MUX9 select a total of three outputs which are the image data LKIA, LKIB from external circuits and the output image data from the terminal F of the preceding stage.

The status data obtained as the result of calculation in each accumulator ALU is transmitted to the vertically adjacent next-stage accumulator ALU while being supplied also to the status register SR1–SR3 so as to be stored temporarily therein. Each status data (1 bit) is supplied to the entire next-stage sequencers SEQ1–SEQ3, where the three status data are mutually combined to be used as an address signal of 3 lower-order bits. And this signal designates a 3-bit address relative to the microprograms stored in the sequencers SEQ1–SEQ3 respectively. Such combination of the data is effective to achieve faster pipeline processing.

Figure 3:
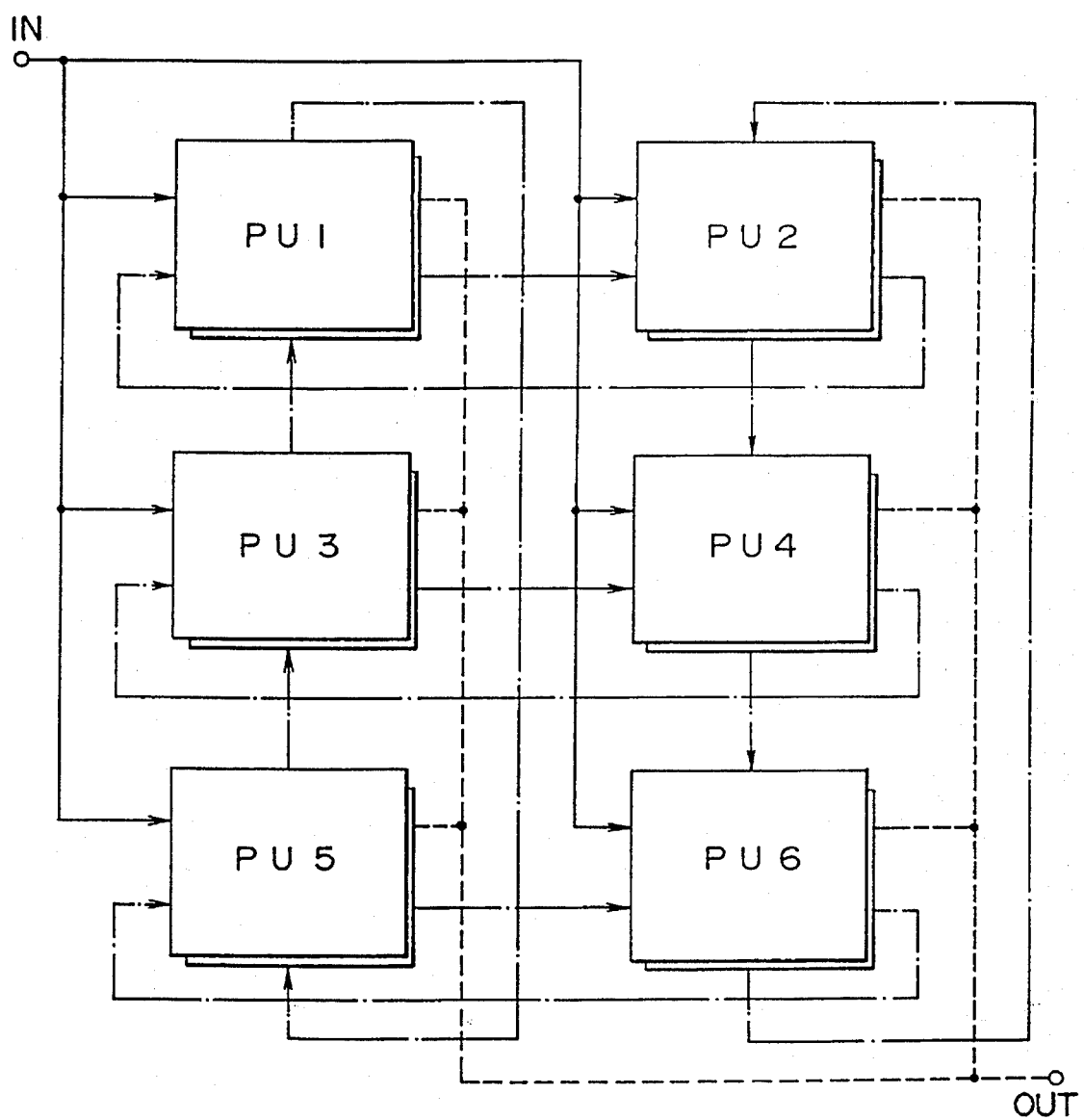
FIG. 3 is a block diagram showing a basic combination of a plurality of image processor units.

An image processor is constituted of general-purpose processor units PU each having the configuration of FIG. 2. FIG. 3 shows its fundamental constitution.

The image processor of FIG. 3 comprises 6 general-purpose processor units PU, wherein a solid line denotes a path of data to be processed, and a broken line denotes a path of output image data. A chained line denotes a path (flow) of the data to be processed. The processor units are so arranged that the data flows as indicated by a chained line between the horizontally adjacent processor units (PU1, PU2), (PU3, PU4) or (PU5, PU6), wherein the data is transmitted as indicated by a chained line between the vertically adjacent processor units (PU1, PU3, PU5) or (PU2, PU4, PU6).

Figure 4:
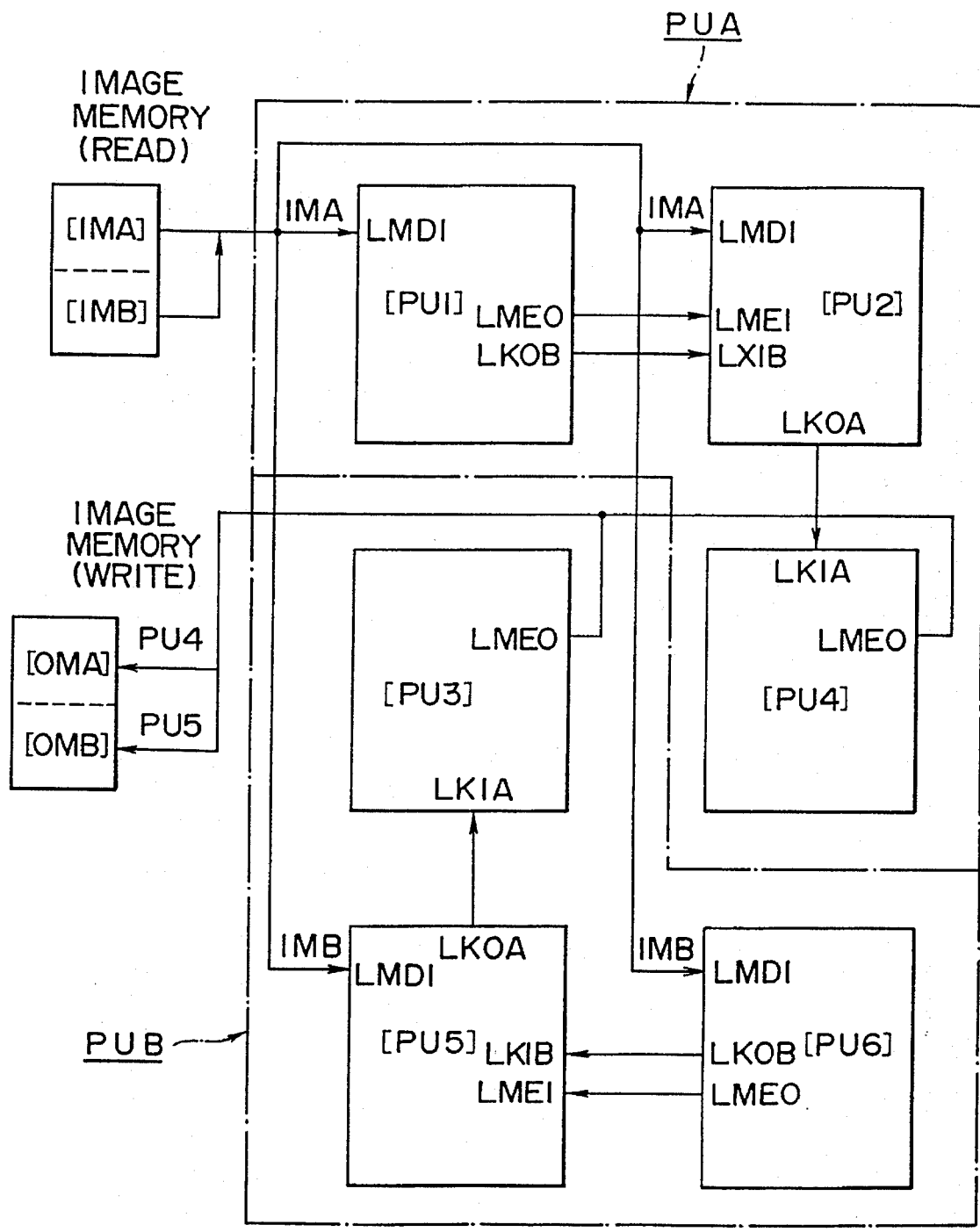
FIG. 4 is a block diagram of the image processor for use in product sum calculation.

Therefore, when a process of edge detection filtering (product sum calculation of 3 pixels×3 lines, or 5 pixels×5 lines) for example is to be executed with respect to the image data of one picture stored in one image memory, the processor is so constituted as shown in FIG. 4.

This diagram represents an exemplary image processor according to the second aspect of the present invention for product sum calculation, and it is a preferred embodiment contrived particularly for executing a (5×5) product sum calculation. Since merely four line memories are incorporated in each processor unit, there are employed three processor units, of which two are used for the product sum calculation, and the result of such calculation is loaded in the remaining processor unit.

In the example of this diagram, an image memory IM is split into upper and lower areas which are processed simultaneously, and the results thereof are written in the other image memory OM. In this case, as shown, the six processor units are divided into two groups (PU1-PU2-PU4) and (PU6-PU5-PU3) which function as processor units PUA and PUB to perform parallel image processing.

The image processing in this operation is executed in a pipeline flow as indicated by the arrows, and one image data IMA is inputted to the processor units PU1 and PU2, while the other image data IMB is inputted to the processor units PU6 and PU5. Subsequently the processed image data OMA and OMB are outputted from the processor units PU4 and PU3 respectively.

FIG. 5 shows an exemplary array of image data Dij, and FIG. 6 shows filter coefficients Mij used therefor. Image data of (5 pixels×5 lines) is processed in such a manner that first the image data is multiplied by the filter coefficient for each of the lines a–e, and then the multiplied outputs obtained respectively for the individual lines a–e are added. The multiplication is executed in the processor units PU1 and PU2, and subsequently the addition is executed in the processor unit PU6.

Figure 7:
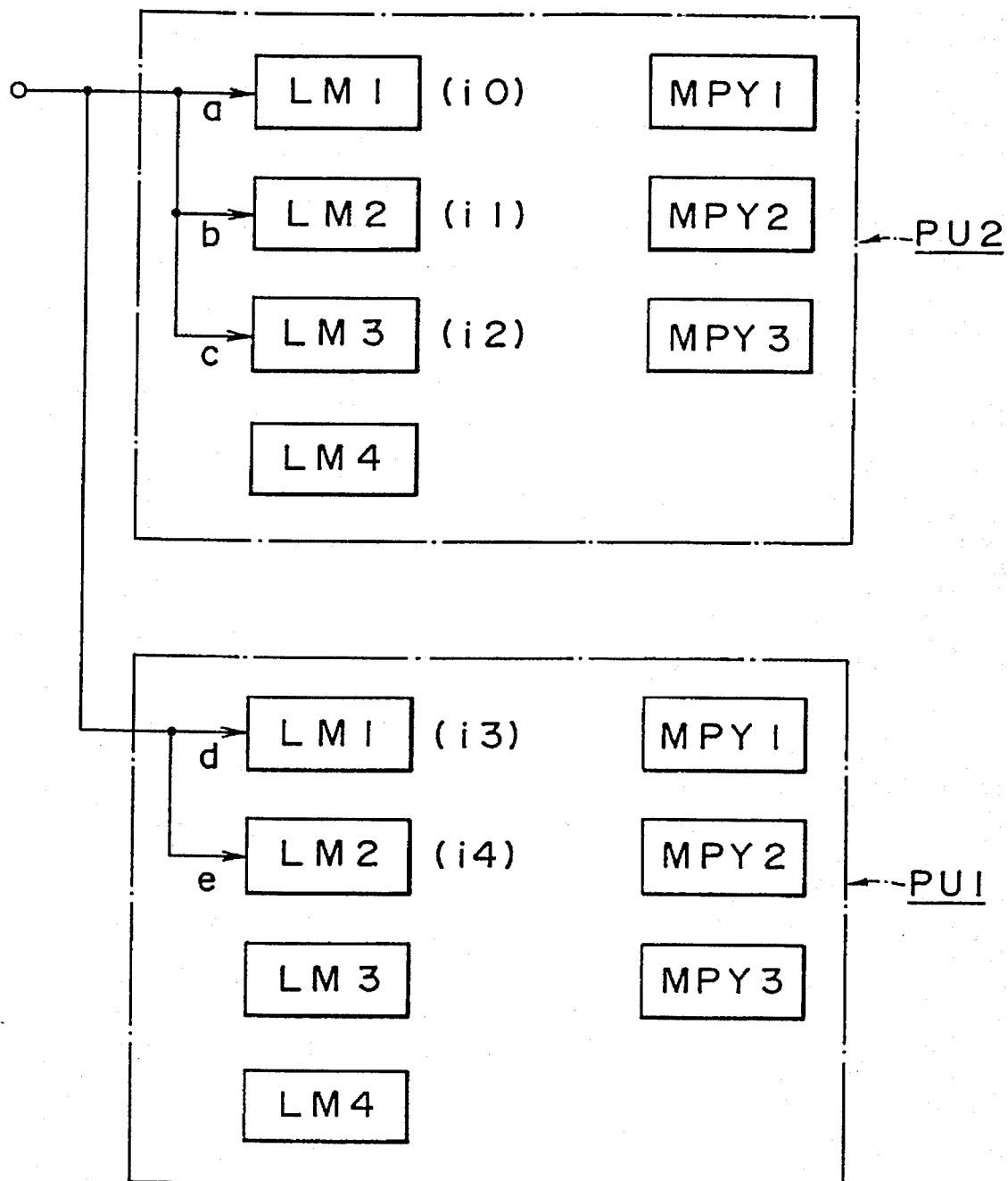
FIG. 7 is a block diagram for explaining how a product sum calculation is executed.
Figure 8:
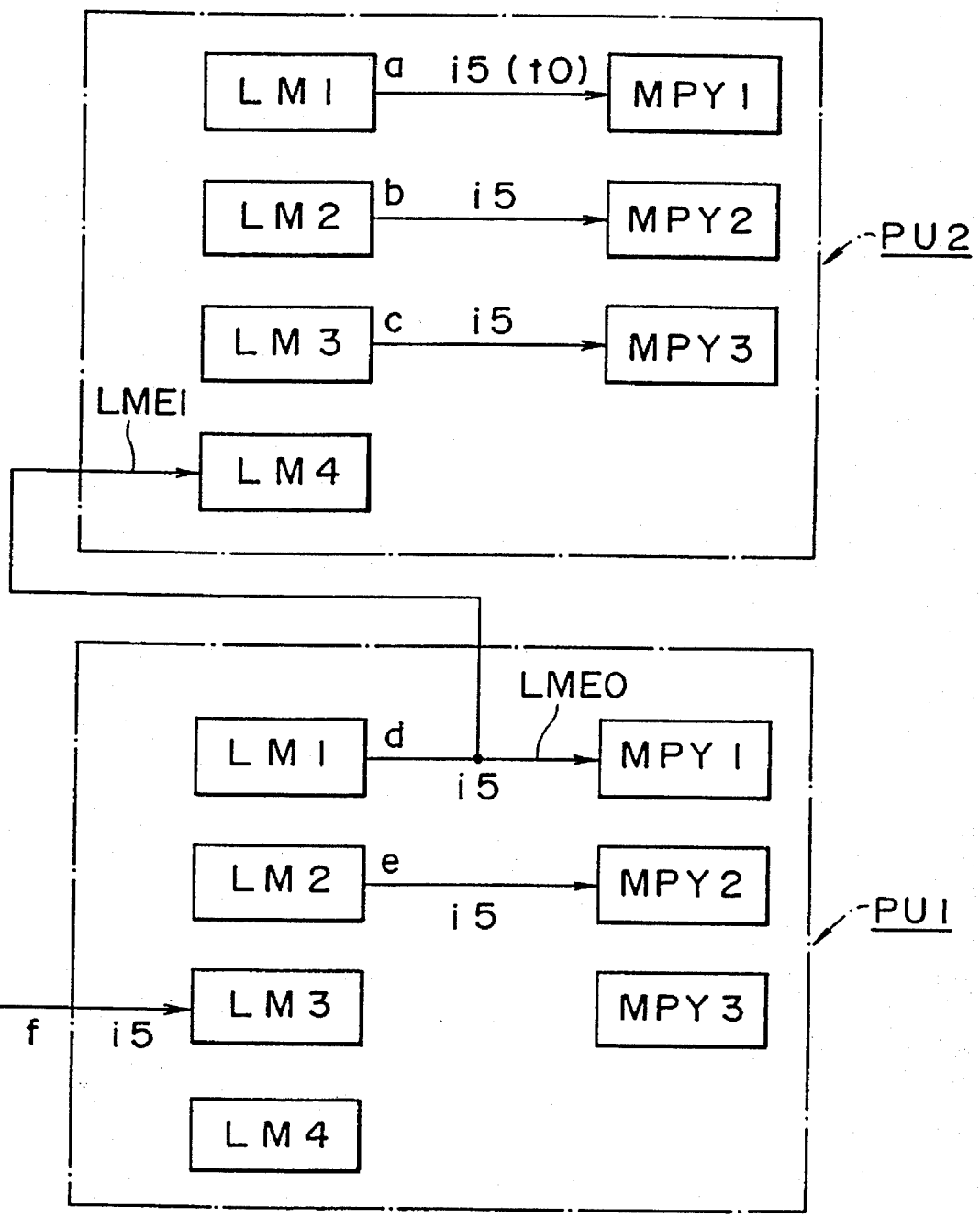
FIG. 8 is another block diagram for explaining how the product sum calculation is executed.
Figure 9:
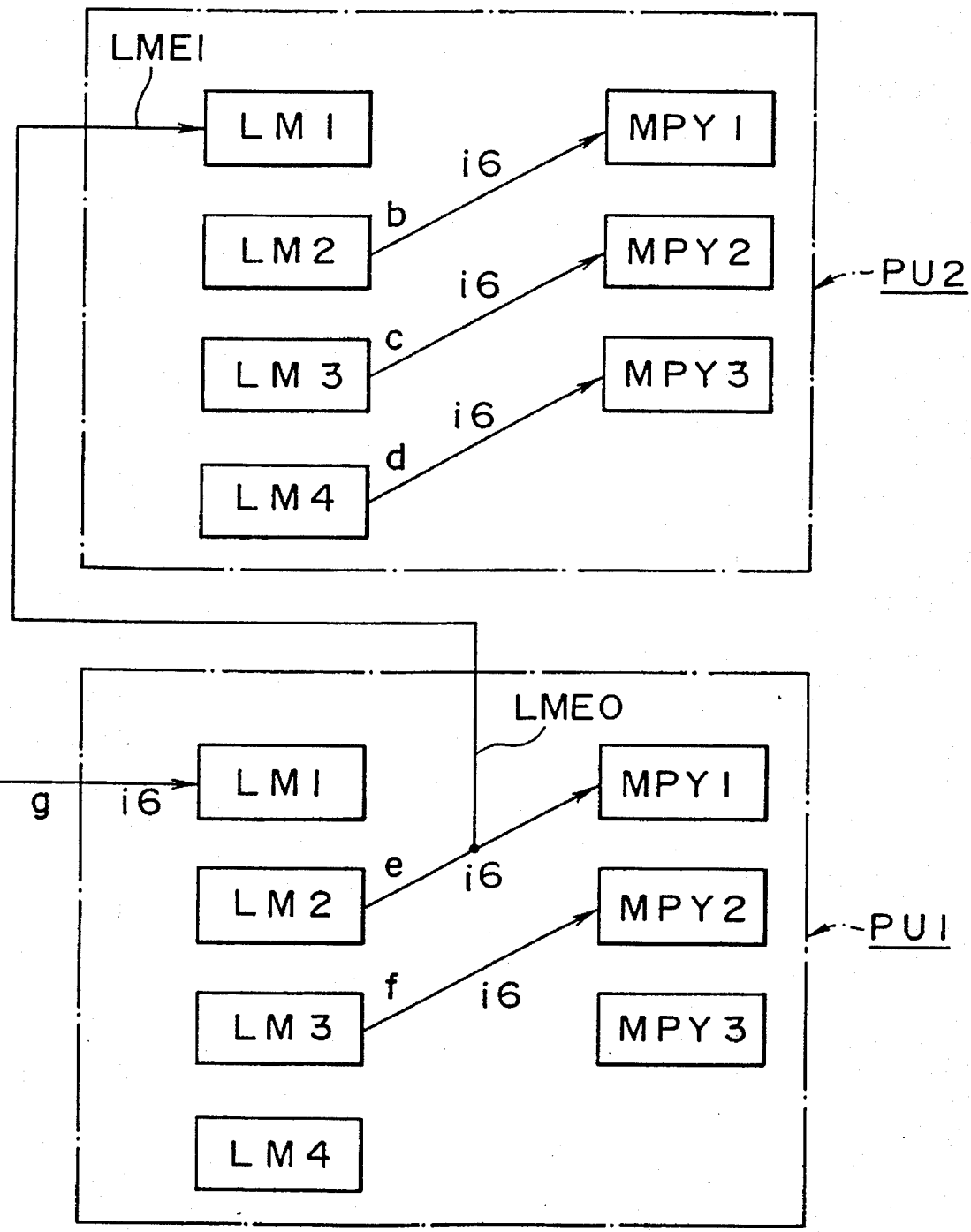
FIG. 9 is a further block diagram for explaining how the product sum calculation is executed.

FIGS. 7 through 9 are diagrams for explaining such multiplication. The processor unit PU2 shown in FIG. 7 uses three line memories LM1–LM3, and the image data of the lines a–c are loaded therein sequentially (at time points i0–i2).

The processor unit PU1 uses two line memories LM4 and LM5, and the image data of the corresponding lines d and e are loaded therein sequentially (at time points i3 and i4). When the image data have been loaded in the entire five line memories LM, the image data are read out sequentially therefrom per pixel line by line as shown in FIG. 8 and then are multiplied in the corresponding multipliers MPY1–MPY3 respectively.

An example of such multiplication process relative to the line a will now be described below with reference to FIG. 10. Processing step a in this diagram represents the multiplication executed by the multiplier MPY1 in the processor unit PU2. And time point t0 shown in FIG. 10 corresponds to time point i5 in FIG. 8.

Simultaneously with such multiplication, the image data of the next line f is loaded in the empty line memory LM3 of the processor unit PU1, and the image data of the line memory LM1 in the first stage of the processor unit PU1 is loaded in the empty line memory LM4 of the processor unit PU2. Time point i6 corresponds to time point t0 after completion of processing one line.

The operations of loading the image data of each new line and shifting the image data into the empty line memory are performed due to the necessity of updating the image data line by line sequentially and executing the product sum calculation of the (5×5) image data.

Mutual transfer of the image data between the processor units is performed by utilizing the line memories LMEO and LMEI as described also in regard to FIG. 2.

Upon completion of the product sum calculation relative to the lines a–e, a 1-line shift is performed, and then a product sum calculation is executed relative to the lines b–f as shown in FIG. 9. And thereafter operations of loading the data of the line g and shifting the data of the line e are performed to prepare for the next process. Such procedure is executed until completion of the final line to thereby terminate the product sum calculation of the entire (5×5) image data.

At step a, as shown in FIG. 10, a multiplication is executed per pixel in the multipliers MPY, and the outputs thereof are loaded sequentially in the register files RF. And upon completion of multiplying the data of 5 pixels, the loaded outputs are read out at step b and then are supplied to the accumulator ALU1 so as to be added. More specifically, an addition of the multiplied outputs of 5 pixels is executed in the accumulator ALU1, and the final addition output R10 (denoted by R10$a$ due to the process of line a) is loaded via the terminal C of the register file RF1 in the same processor element PE 1.

At the next timing (step c in FIG. 10), the addition output R10$a$ is loaded in the register file RF1 incorporated in the processor element PE1 of the processor unit PU4, so as to prepare for the addition relative to the next line. At this time, as shown in FIG. 2, the data are inputted and outputted via LKOA and LKIA (or LKOB and LKIB).

Figure 11:
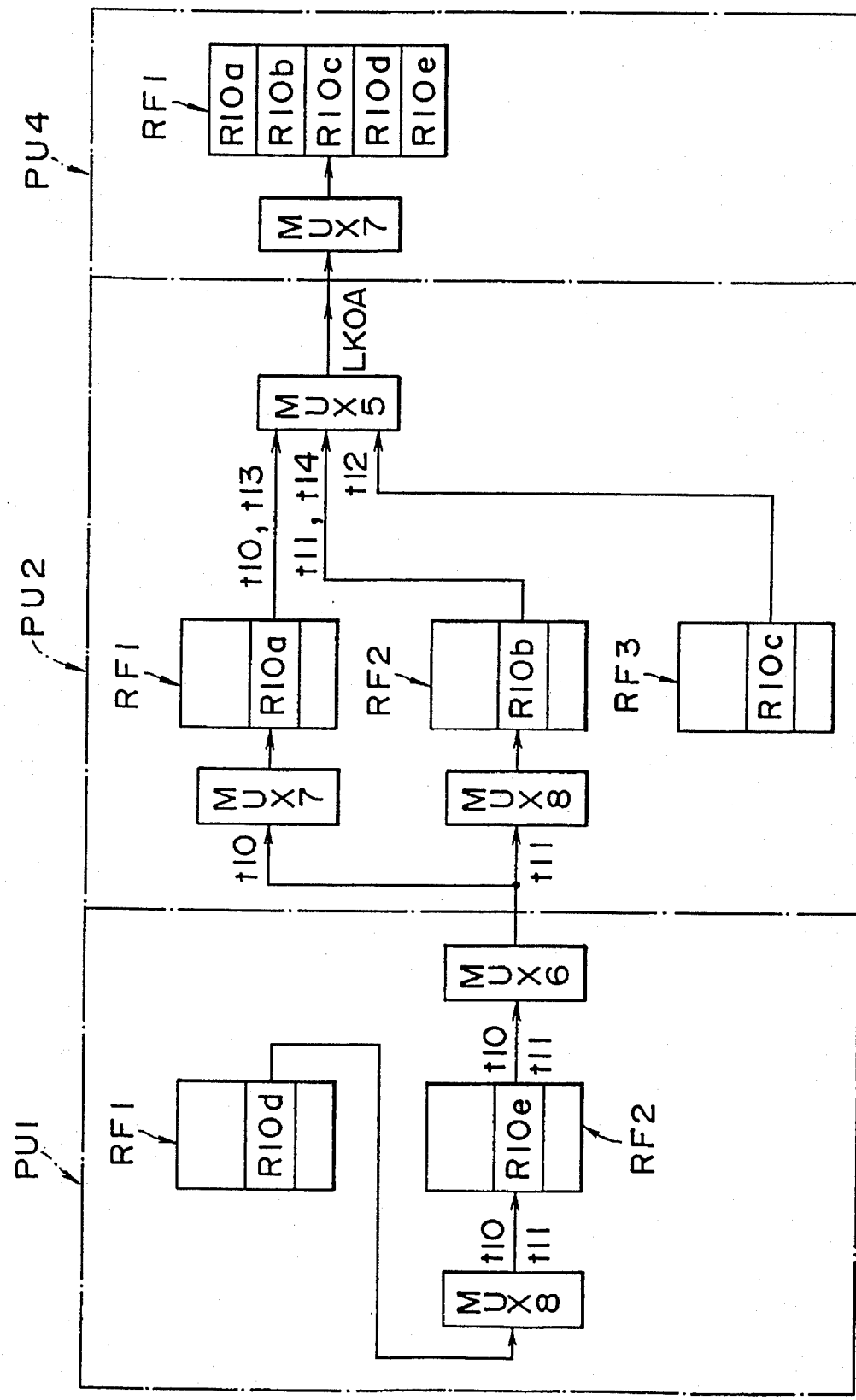
FIG. 11 is a block diagram for explaining an exemplary execution of adding (5×5) image data.

Since the data flow is unidirectional as shown in FIG. 4 (processor units PU2-PU1-PU4), the data is transmitted to the final processor unit PU4 along the flow shown in FIG. 11.

Referring now to FIG. 12, the entire addition outputs R10$a$–R10$e$ relative to the lines a–e are obtained at time point t9. Then the output R10$a$ is transferred to the processor unit PU4 at time point t10, and simultaneously the output R10$e$ is loaded in the register file RF1 of the processor unit PU2, and also the output R10$d$ is loaded in the register file RF2 of the same processor unit.

At the next time point t11, the addition output R10$b$ is transferred to the processor unit PU4, and simultaneously the addition output R10$d$ is loaded in the register file RF2 of the processor unit PU2. In this manner, the entire addition outputs R10$a$–R10$e$ are transferred sequentially to the processor unit PU4.

Figure 13:
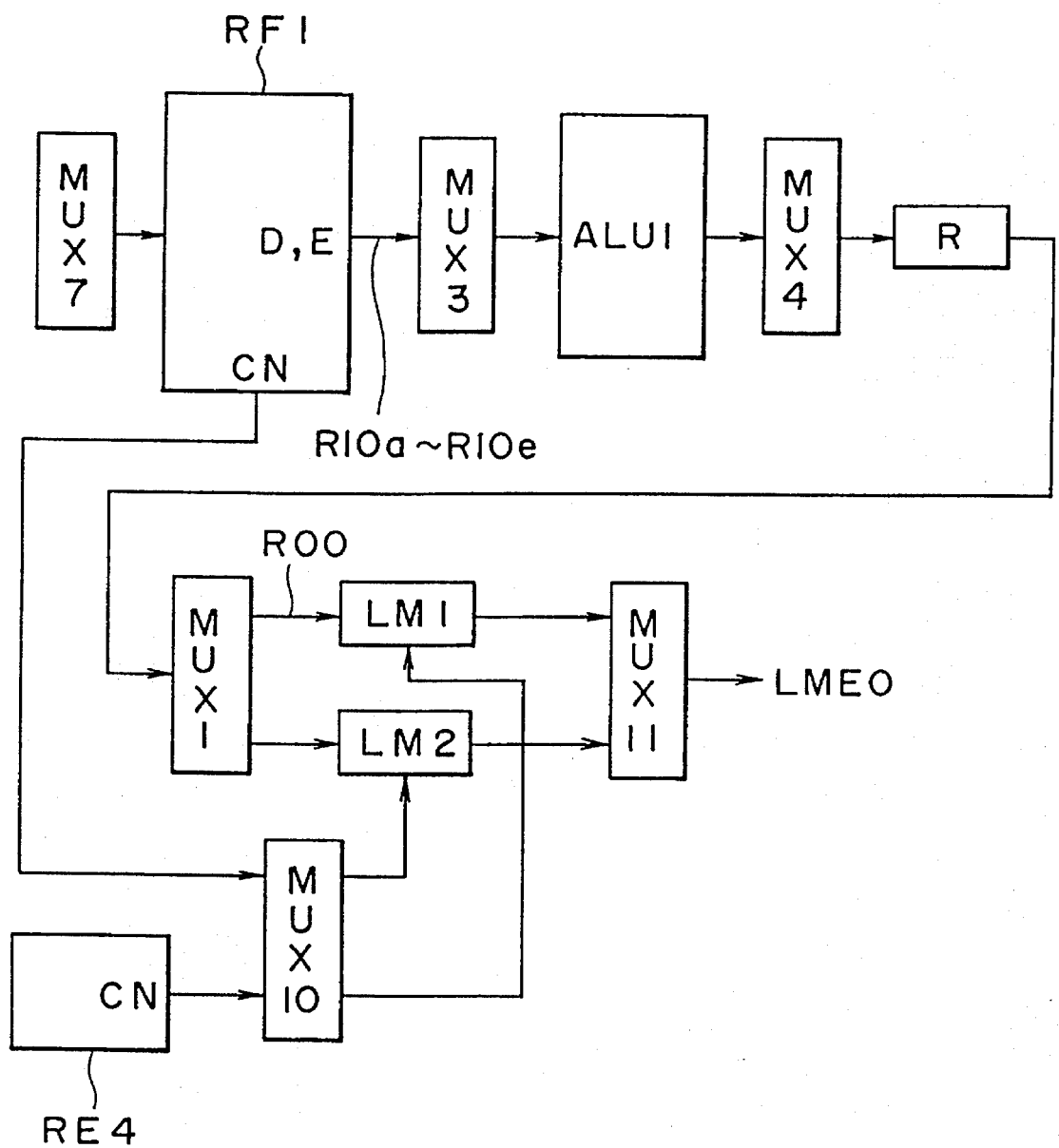
FIG. 13 is a diagram for explaining a processing operation performed in a processor unit PU4.

Subsequently the following interline addition is executed in the processor unit PU4. This process will be described below with reference to FIGS. 12 and 13.

Since the entire addition outputs R10$a$–R10$e$ of 5 lines are obtained at time point t14, such outputs R10$a$–R10$e$ are sequentially supplied to the accumulator ALU1 so as to be added (at time points t15–t18 in FIG. 12). The final addition result R00 becomes filtered image data in the pixel D00, and then this data is written in the line memory LM1 via the input switching means MUX4, the register R and the input switching means MUX1 shown in FIG. 13.

After the image data Rij derived from the final addition result of one line has thus been stored in the line memory LM1, the image data Rij derived from the final addition result of the next line is written in the next line memory LM2. And simultaneously the content of the line memory LM1 is read out therefrom and then is stored as the processed image data in an external image memory OM.

Selection of the line memory LM for writing the image data Rij is controlled in accordance with the output of the address counter CN in the register file RF1. And when the image data Rij in the line memory LM is stored in the external memory OM, the above selection is controlled in accordance with the output of the processor element PE1.

Figures 14, 15:
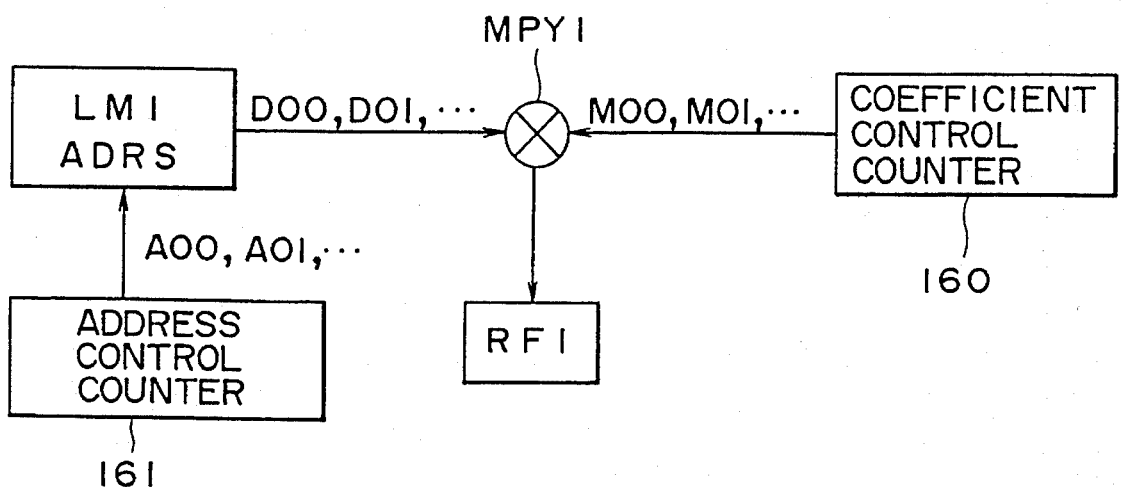
FIG. 14 shows an example of mask data.
FIG. 15 is a block diagram for explaining an exemplary execution of multiplication with the use of specific mask data.

FIG. 14 shows the values of coefficients in the case of using Cany's filters as filtering coefficients (mask data). Since a coefficient "0" exists in the Cany's filters as shown, the filtering (multiplication) relative to the ith (3rd) pixel is not necessary. Therefore a coefficient control counter 160, whose output is supplied to the multiplier MPY1, is so contrived that, as partially shown in a block diagram of FIG. 15, the mask data "0" is not outputted as shown in FIG. 16B.

Instead, the address Aij of the image data (address at the time of multiplication) is also controlled as shown in FIG. 17, so that the ith (3rd) multiplication process can be eliminated to consequently shorten the required time for the multiplication.

According to the above procedure for (5×5) data calculation, the image data is split into two as shown in FIG. 4, and the split data are processed simultaneously to thereby shorten the required calculation time to a half. Since the processor element PE itself is designed to perform a pipeline process, the operation time in the processor element PE itself is reducible as well.

Figure 18:
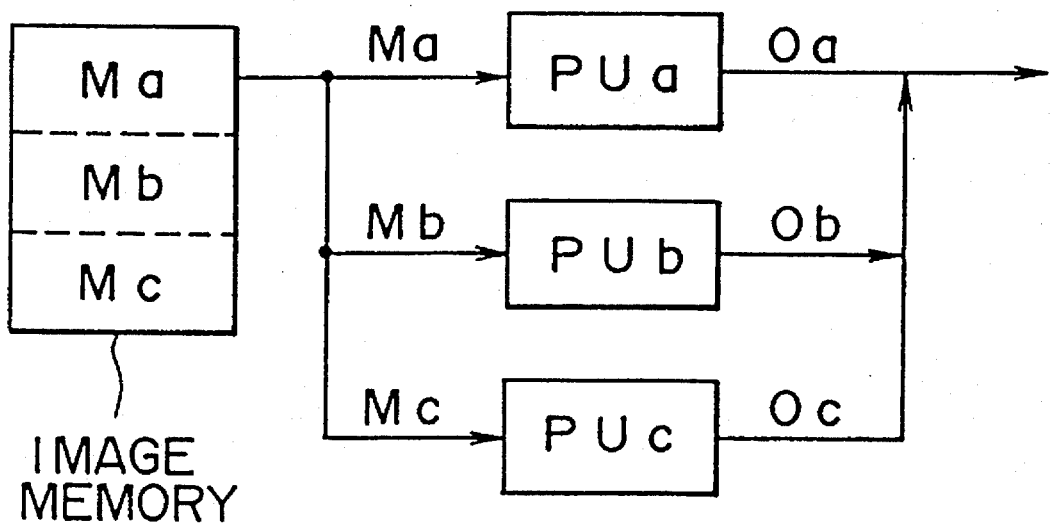
FIG. 18 is a block diagram showing an example of image data split processing.

If the image data is split into three as shown in FIG. 18, the total processing time can further be shortened by parallel-processing the split image data Ma, Mb and Mc in the processor units PUa, PUb and PUc respectively.

Figure 19:
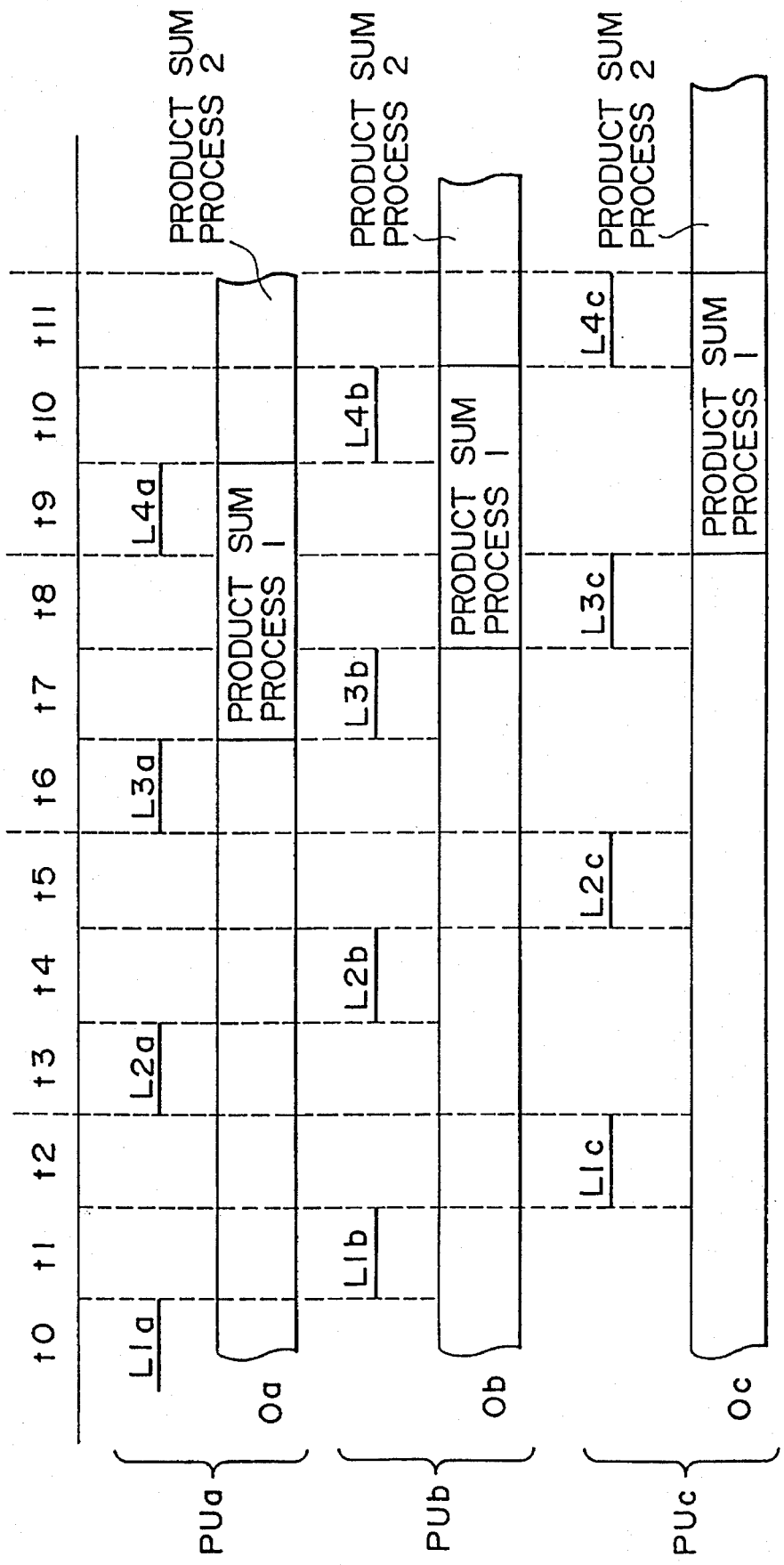
FIG. 19 is a timing chart of signals in the split processing.

In an exemplary case where 3-line image data are simultaneously processed in the individual processor units, the split image data Ma–Mc are loaded line by line as shown in FIG. 19 per 3 timings (corresponding to 1 clock pulse) in the processor units PUa–PUc respectively. And simultaneously with loading the 3-line image data (L1$a$–L3$a$), (L1$b$–L3$b$) and (L1$c$–L3$c$), a process of product sum calculation relative to the image data (L1a–L3a) is executed from the next timing after completion of loading the image data (L1a–L3a). The same process is executed with respect to the other split image data as well.

In such split processing, 3-split operation results (calculation results) are obtained sequentially with a delay of 1 timing, so that it becomes possible to achieve the image processing substantially with 1 clock pulse.

In comparison with the above example of FIG. 19, the required processing time is thrice longer in a conventional case where a product sum calculation is executed upon completion of loading the 3-line image data, and similar image processing is executed after loading the 3-line image data again upon completion of the preceding product sum calculation.

The procedure shown in FIG. 19 is executable due to the improved constitution of this embodiment employing a plurality of line memories LM, wherein image data can be loaded in any desired line memory LM, and the result of calculation is storable in any one or other processor element PE so that the image data can be processed in a pipeline flow.

Hereinafter the third and fourth aspects of the present invention will be described.

FIG. 20 shows a preferred embodiment of the third aspect which represents application of the above-described general-purpose processor to an operation of calculating the logical product (AND) or logucal sum (OR) of image data stored in two image memories.

The embodiment of FIG. 20 is designed to perform conjunction (AND operation), wherein run-length coded image data are stored as line data in image memories i, j. Such coded image data are loaded in processor elements PE1 (for j) and PE2 (for i) incorporated in the same processor unit PU.

FIGS. 21A–21C show exemplary cases of taking an AND from the run length of the i line data in the image memory i and the run length of the j line data in the image memory j. The run length of FIG. 21C is obtained as a result of taking the AND thereof.

Figure 22:
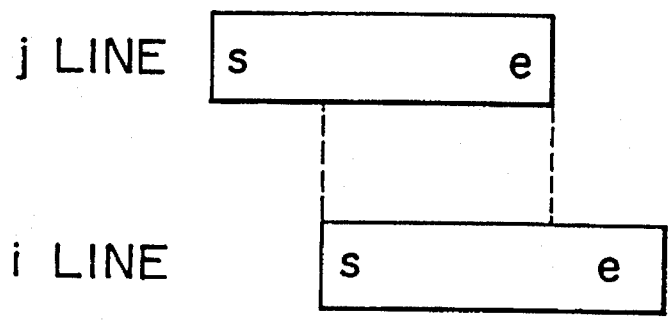
FIG. 22 is a schematic diagram showing an example of run-length code.
Figure 23:
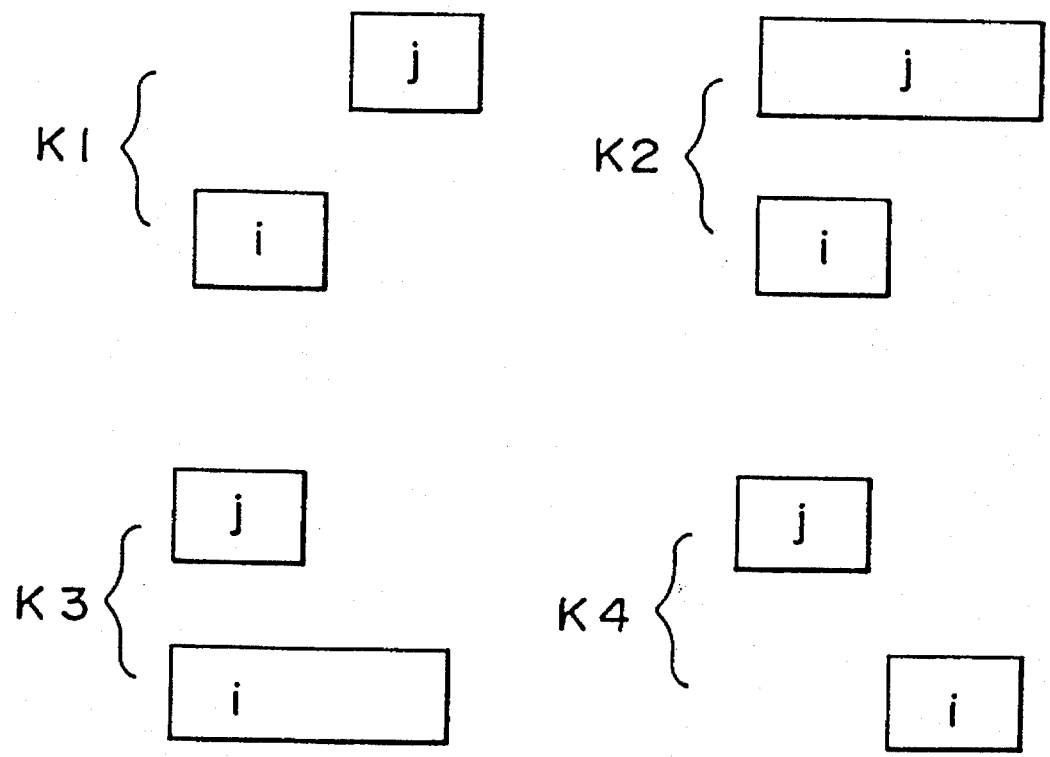
FIG. 23 is a schematic diagram showing conditional branch.

The AND is obtained on the basis of the run-length code by, as shown in FIG. 22, judging the overlap of the two line data with reference to the first start portion s and the final end portion e of each run length. The states of mutual overlap and separation are classified into four kinds of K1 to K4 as shown in FIG. 23. Therefore, after judging the run lengths s-e of the two data, the next process in utilizing the overlap thereof as the next AND output becomes different depending on the kind of the overlap state.

The following decision equations are used for judging the overlap of the lines i and j utilizing the run lengths.

$$a = js - ie - 1 \quad (1)$$

$$b = is - je - 1 \quad (2)$$

$$c = ie - je \quad (3)$$

Figure 24:
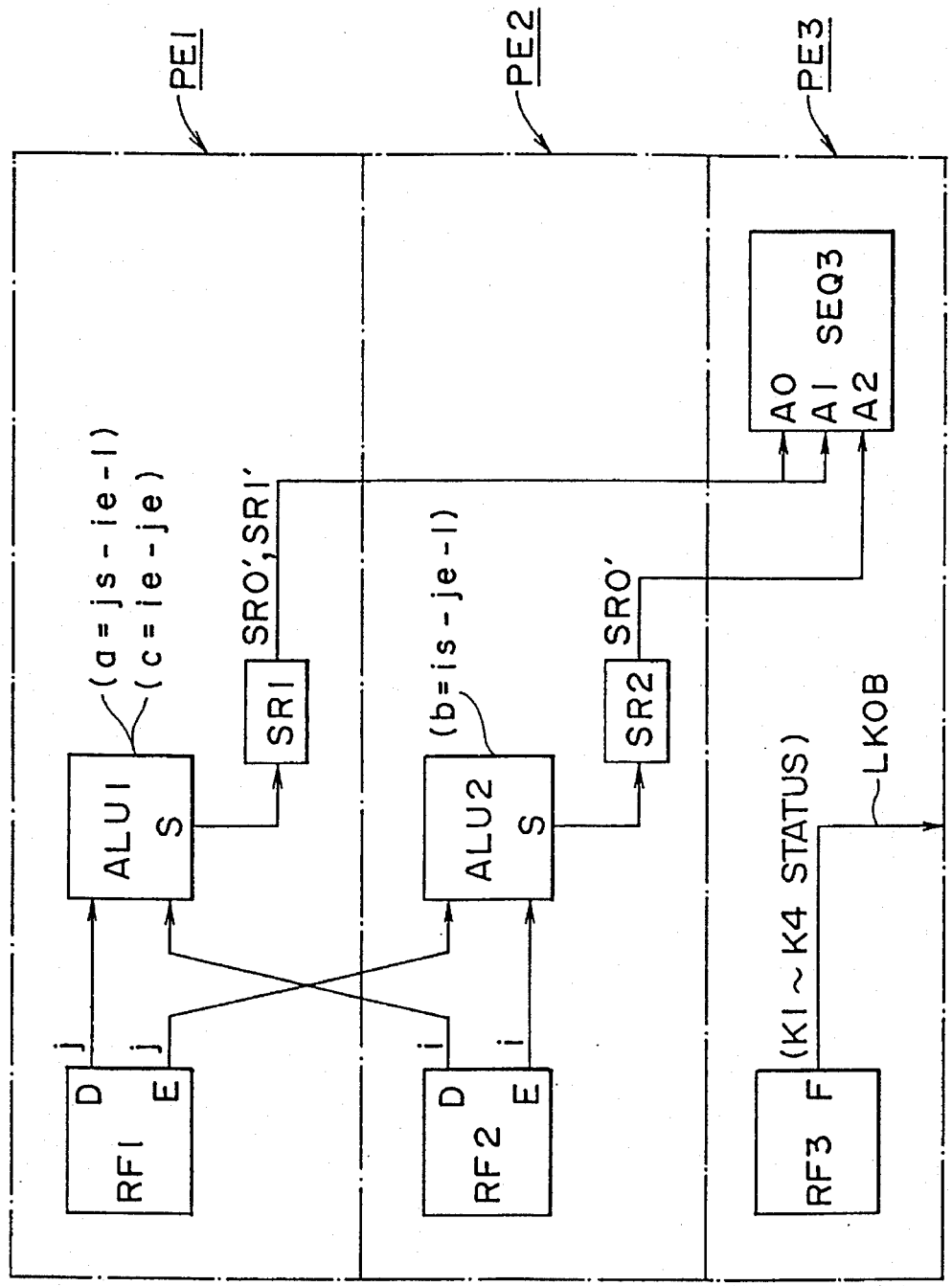
FIG. 24 is a block diagram showing an example of calculation executed between processor elements.

Branch conditions K1–K4 are determined on the basis of such judgment results a, b, c. In Eqs. (1) to (3), i and j represent the respective data of the individual image memories i and j. Accordingly, the data of the mutual processor elements PE need to be used for executing the above judgements. It becomes therefore necessary to transfer the data between the processor elements PE in the same processor unit PU. For this purpose, data paths shown in FIG. 24 are formed by using the input switching means MUX3 shown in FIG. 2, so as to realize execution of the above operation.

First in the processor element PE1, the arithmetic calculation of Eq. (1) is executed at the first timing. The j data (=js) is read from a register file RF1, and the i data (=ie) from a register file RF2 respectively. Then the two data are supplied to an accumulator ALU1 where Eq. (1) is executed. And the result is held in a status register SR1.

At the same timing, the arithmetic calculation of Eq. (2) is executed in the other processor element PE2. For this purpose, the j data (=js) is read from the register file RF1, and the i data (=ie) from the register file RF2 respectively. Then the two data are supplied to an accumulator ALU2 where Eq. (2) is executed. And the result is held in a status register SR2.

Such simultaneous processing is rendered possible due to the constitution where both register files RF1 and RF2 are so arranged that the data s and e can be read out simultaneously from the respective terminals D and E.

At the next timing subsequent to completion of executing Eqs. (1) and (2), Eq. (3) is arithmetically calculated in the processor element PE1. For this purpose, the j data (=js) and the i data (=ie) are read out respectively from the register files RF1 and RF2 and then are supplied to the accumulator ALU1, whereby the calculation of Eq. (3) is executed. And the result is held in the status register SR1.

Here, the status data of Eqs. (1) and (2) thus stored in the status register SR1 are denoted by SR0' and SR1' respectively, and the status data of Eq. (3) stored in the status register SR2 is denoted by SR0'. Such three status data SR0', SR1', SR0' are used as an address A0, A1, A2 of three lower-order bits of a sequencer SEQ3 incorporated in the processor element PE3.

This address is used in a microprogram for designating one of the processing conditions K1–K4 to be branched next on the basis of the status data, and the designated condition is outputted from the register file RF3 of the same processor element PE3.

In the relationship of FIG. 25 between the results of the conditional equations (a)–(c) and logic "0" and "1", the branch condition K1 is selected when the status data are, e.g., "011" (of which logic values represent the status data arranged in the order of (a), (b), (c)). The branch condition K1 signifies one processing condition where the i line and the j line do not overlap mutually as shown in FIG. 23. The AND output becomes zero in this case.

When the status data are "111", the branch condition K2 is selected. Since this condition K2 indicates a state where the j line partially overlaps the i line as shown in FIG. 23, a program of the branch condition K2 is prepared for obtaining the AND output shown in FIG. 21C.

If the constitution is such that the status data obtained in the mutually different processor elements PE1 and PE2 are combined with each other so as to be usable directly as one address to the microprogram, then it becomes possible to shorten the required processing time in comparison with another case where the status data are once stored in shift registers or the like and the microprogram is started after completion of the entire status data, hence further enhancing the effect of the pipeline processing.

Since the processor of the present invention ensures general-purpose usability, it is possible to simply realize extension of the product sum calculating function merely by increasing the number of processor units PU as described above, and further to perform the calculating operation using the mutual data of the plural processor elements PE in the same processor unit PU. In addition, the processor is capable of serving also as a control circuit for image memories.

Figure 26:
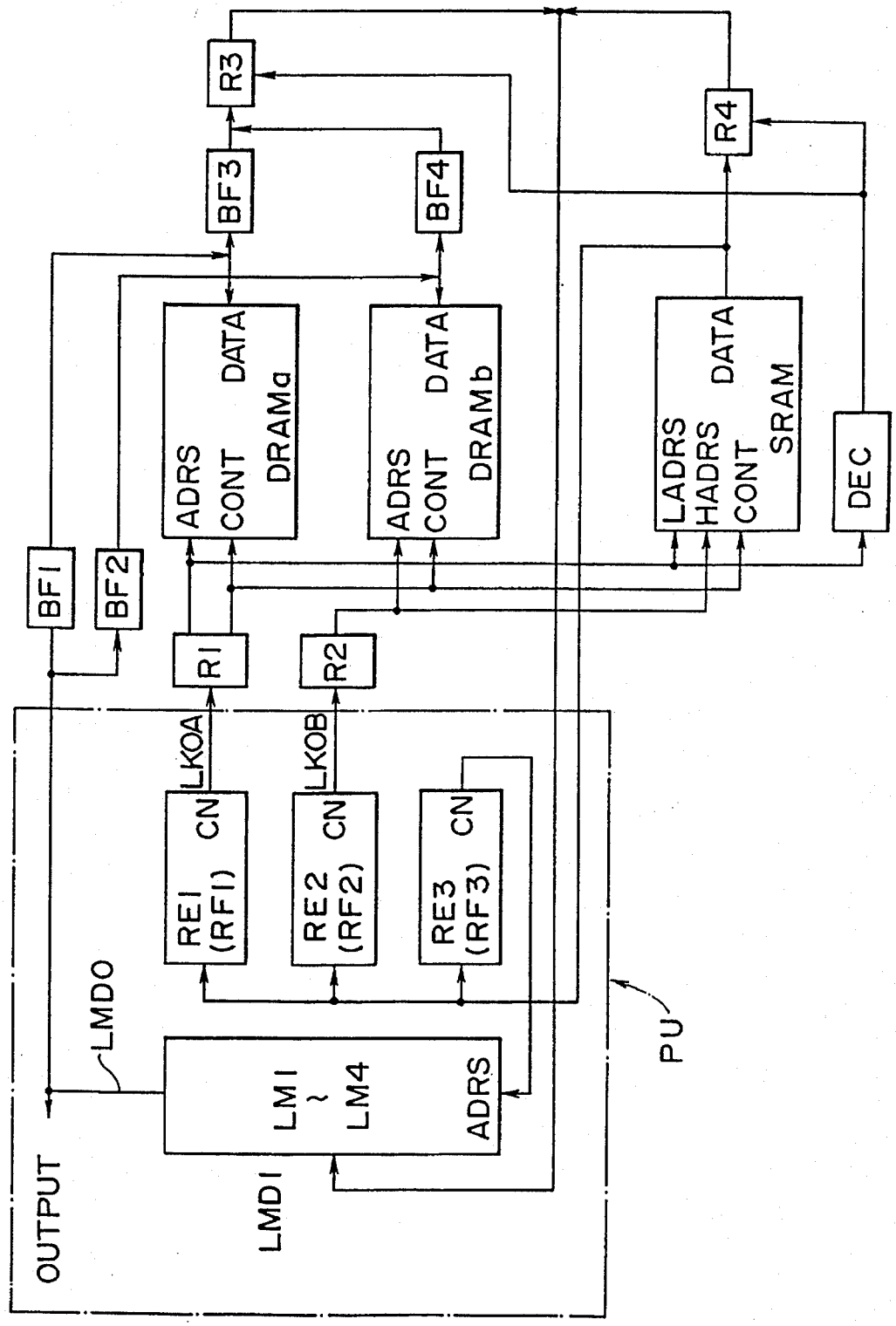
FIG. 26 is a block diagram of an exemplary image-memory control circuit.

The fourth aspect of the invention is concerned with a case of using the general-purpose processor as a control circuit for image memories. FIG. 26 is a system diagram of an exemplary constitution designed for such purpose.

In this embodiment, image memories to be controlled include an SRAM and a pair of DRAMs. A single general-purpose processor unit PU is employed here, and register files RF1 and RF2 incorporated in processor elements PE function as address generators.

A lower address LADRS of the SRAM is designated in the register file RF1, and a higher address HADRS thereof is designated in the register file RF2. And a write enable signal is supplied from the register file RF1 to a terminal CONT. Image data in the SRAM is loaded in line memories LM through control of a register R4 or is loaded directly in the register files RF1, RF2 and RF3.

In the DRAMa and DRAMb, reading and writing operations are performed alternately so as to achieve fast access. The DRAMa is controlled by the register file RF1, while the DRAMb is controlled by the register file RF2. To the respective terminals CONT, there are supplied signals RAS and CAS for designating row and column addresses, and also a write enable signal.

The image data read from the line memory LM is supplied via the buffer registers BF1 or BF2 to the corresponding DRAM and then is written therein. And the image data read from the DRAMa or DRAMb is loaded in the line memory LM via the buffer register BF3 or BF4.

The registers R3 and R4 are controlled by a decoder DEC and are used for selecting the data of the SRAM and the DRAMs respectively. A control signal is supplied from the register file RF1 to the decoder DEC. The register file RF3 incorporated in the processor element PE3 serves to select the desired line memory LM.

FIG. 27 is an exemplary timing chart of signals for controlling the DRAMs. As shown in FIGS. 27A to 27C, even-numbered addresses in the DRAMa are designated from the processor element PE1, while odd-numbered addresses in the DRAMb are designated from the processor element PE2 with a shift of 1 clock pulse as shown in FIGS. 27F to 27H.

When a read clock signal having double the period of a reference clock signal is supplied to the memories as shown in FIG. 27J, the image data are read out therefrom at the timings shown in FIGS. 27E and 27I, so that finally the image data are outputted sequentially at the same timing as that of the reference clock signal as shown in FIG. 27K.

It is to be understood that the embodiments described hereinabove are merely illustrative examples of the present invention, and it is a matter of course that the invention is applicable to other cases as well besides such preferred embodiments without departing from the scope defined in the appended claims.

What is claimed is:

1. An image processor including one or more general-purpose processor units, comprising:
   a plurality of processor elements each having a product sum calculating function, each of said processor elements including a line memory for writing the data therein, a multiplier for multiplying the output data of said line memory, a register file for storing the multiplier output, and an accumulator for calculating the output of said register file;
   connections for transferring data between said plurality of processor elements; and
   input switching means disposed in respective preceding stages of the individual processing circuits so as to perform selection of data;
   wherein the data in an arbitrary processing step of any one processor element can be transferred to an arbitrary processing step of any other processor element via said connections.

2. The image processor according to claim 1, wherein the product sum calculation of the data is executed by pipeline processing.

3. The image processor according to claim 1, wherein three general-purpose processor units are employed for executing the product sum calculation of image data of (5 pixels×5 lines), and two of such processor units are used for the intra-line data processing, while the remaining processor unit is used for the inter-line data processing.

4. The image processor according to claim 1, wherein two or more processor elements for inputting the data from the respective image memories are employed in processing the mutual data of two or more image memories, and the data loaded in the register file of any processor element can be selectively fed into the accumulator, which is incorporated in another processor element, through control of the input switching means disposed in the preceding stage of the relevant multiplier.

5. The image processor according to claim 4, wherein status data derived from the calculation results in the accumulators incorporated in the two processor elements are combined with each other and are used as address data of a microprogram for the branch condition to be processed next.

6. The image processor according to claim 1, wherein, when said processor unit is used as an image-memory control circuit, two of the processor elements included therein serve as address generators for image memories, and image data read from said image memories are once stored in the line memories of said processor unit while being controlled by a remaining processor element.

* * * * *